United States Patent Office 3,551,367
Patented Dec. 29, 1970

3,551,367
ARYLATED FATTY ACID-MODIFIED WATER-DISPERSIBLE POLYESTERS
Alton J. Gasper, Minneapolis, and David D. Taft, Edina, Minn., assignors to Ashland Oil, Inc., a corporation of Kentucky
No Drawing. Filed June 28, 1968, Ser. No. 740,986
Int. Cl. C08g 17/16; C09d 3/64, 3/66
U.S. Cl. 260—20                                    19 Claims

ABSTRACT OF THE DISCLOSURE

An aryl substituted higher fatty acid, such as phenyl stearic acid, is incorporated as a reactant in the preparation of water-dispersible polyesters, especially those derived from polyoxyalkylene glycols, to internally plasticize the polyester. The modified polyesters are suitable as coating resins alone or in mixtures with water-dispersible phenoplast or aminoplast resins.

The present invention relates to water-dispersible resins and their preparation. More specifically, the present invention relates to water-dispersible polyesters which are modified in a novel manner.

The polyesters of the early prior art were generally insoluble in water. Consequently, they were usually applied from organic solvents. Where organic solvents were employed, the usual fire and health hazards, as well as cost, associated with such organic solvents, were inevitably present. More recently, much of the effort in the art has been directed toward producing polyesters and other resins which are water-dispersible. A certain degree of success has been recorded in the production of water dispersible polyesters; however, these polyesters have some undesirable properties. Among these disadvantageous properties is the brittleness of the films produced from the polyesters. Two of the important uses of polyester resins are as coating materials and as textile treating agents. In both applications, it is important that the polyester resin be uniformly deposited as a strongly adherent, flexible, and non-brittle film.

It is, therefore, an object of this invention to provide a novel modified water-dispersible polyester resin.

It is another object of this invention to provide a water-dispersible polyester resin which exhibits outstanding flexibility and a non-brittleness.

Still other objects will be apparent to those skilled in the art from the following discussion.

The novel modified polyester resins of this invention comprise the condensation product of polycarboxylic acids and polyols conventionally used to prepare water-dispersible resins with the addition, as a novel feature, of a mono-aryl substituted monocarboxylic higher fatty acid reactant. The aryl substituted fatty acids which comprise the novel reactant in accordance with this invention are simply included in the reaction mix as a coreactant.

The mono-aryl substituted fatty acids which comprise the unique polyester modifying agents in accordance with this invention are monocarboxylic acids having 8 to 24 carbon atoms in the alkyl chain which is substituted with an aryl group. The aryl substituent can be phenyl, naphthyl, or phenyl or naphthyl substituted with alkyl, preferably having 1 to 8 carbons. The aryl group can also be substituted with other groups, such as halogen, hydroxy, alkoxy, and the like. A particularly preferred group of aryl substituted fatty acids are those having 16 to 22 carbon atoms in the alkyl chain. The preferred aryl substituent is phenyl. The most preferred aryl substituted fatty acids are the various isomers of phenyl stearic acid, because of availability and economics.

The aryl substituted fatty acids which comprise a polyester modification agent in this invention can be prepared by the methods disclosed in Ser. No. 445,786 filed Apr. 5, 1965, now abandoned.

The aryl substituted fatty acid modification of polyesters can, in general, be adapted to any of the water-soluble polyester systems. A number of water-soluble polyesters are known in the art, as shown, for example, in U.S. 3,223,659 to Curtice et al. and U.S. 3,310,512 to Curtice. The polyester resins disclosed in the latter patent and modified according to the method of this invention provide particularly desirable water-dispersible products.

The following reactants provide preferred modified polyester resins in accordance with this invention:

(A) A mono-aryl substituted monocarboxylic fatty acid having 8 to 24 carbon atoms in the alkyl chain and an aryl substituent which is phenyl, naphthyl, or phenyl or naphthyl substituted with alkyl having 1 to 8 carbon atoms, or hydroxyl;

(B) A dicarboxylic acid or anhydride acid selected from the group consisting of isophthalic, terephthalic and o-phthalic acid or anhydrides and mixtures thereof:

(C) A non-oxidizing, saturated aliphatic dicarboxylic acid containing 4 to 18 carbon atoms;

(D) A polyoxyalkylene selected from the group consisting of polyethylene glycol and polypropylene glycol having a molecular weight between 600 and 6,000; and (E) At least one saturated polyhydric alcohol containing from 2 to 16 carbon atoms and at least two hydroxy groups, a total of 0.95 to 1.8 moles of polyol being present per mole of dicarboxylic acid.

As stated above, it is preferred that the (A) reactant, the aryl substituted fatty acid modifier, be present in amounts ranging from about 10 to 25% by weight of the total reactants in the polyester. Within these limits, it is preferred that the reactants be selected and polymerized to a point where the finished polyester has an acid number of below about 35, e.g. 15 to 30. For most purposes, it is particularly preferred that the finished acid number be in the range of about 25 to 30. Polyesters having acid numbers greater than about 35 are found to be excessively water-sensitive. Polyesters having acid numbers much below about 25 are difficult to dissolve in water and may require the addition of a miscible organic co-solvent in substantial amounts.

The esterification reaction is ordinarily conducted at temperatures within the range of 350° to 575° F., and more usually, within the range of 370° to 500° F. The esterification is continued until the desired acid number, as discussed above, is reached. If desired, the esterification can be conducted under an inert atmosphere, e.g., nitrogen. Also ordinary esterification catalysts can be used, if desired. It has been found, however, that catalysts are not necessary to obtain a suitable product.

All of the polyester ingredients can be reacted simultaneously. The reaction can also be conducted in stepwise fashion with incremental additions of each polyol and carboxylic acid. In this manner, a definite structural pattern can be obtained in the polyester.

Once the polyester ingredients have been reacted to form a polyester of the desired acid value, the polyester can be dispersed in water. Dispersion can be conducted by (1) neutralizing residual acidity in the polyester resin, and then adding the neutralized resin to the water (preferably under rapid agitation), or (2) by the addition of the resin, under rapid agitation, to a mixture of the water and a suitable neutralizing agent. Both methods produce similar results.

Although common neutralizing agents, such as potassium hydroxide and the like, can be used to neutralize the residual acidity of the polyesters, it is preferred to use a volatile, non-metallic neutralizing agent. The metal cation is believed to cause inferior moisture resistant in the cured films. Ammonia and amines volatile at a temperature of less than about 375° F. (measured at normal atmospheric pressure) are preferred neutralizing agents. Examples of suitable neutralizing agents include ammonia, alkyl amines, dialkyl amines, trialkyl amines, alkanol amines, dialkylalkanol amines, alkyldialkanol amines, and the like. Of these, the tertiary amines (e.g., the trialkyl amines) are preferred. Triethyl amine is an example of a particularly preferred (trialkyl) amine.

In some cases, it is desirable to use co-solvents to produce a more stable aqueous dispersion of the polyester. The co-solvent can be added prior to, during, or after neutralization. In general, the co-solvents are water-miscible organic solvents. Examples include Cellosolve acetate, butyl Carbitol, Cellosolve, Carbitol, and tertiary butanol.

Among the aryl substituted fatty acids, those having a hydroxyl substituent, e.g., p-hydroxy phenyl stearic acid, are particularly preferred. The polyesters containing a hydroxy-substituted arylated fatty acid can be made self-crosslinking by reaction of the polyester with an aldehyde, e.g., formaldehyde. Also, the aldehyde modified polyester containing a hydroxy substituted aryl fatty acid can be reacted with a broad variety of hydroxyl-containing materials, e.g., polyols, celluloses, and hydroxy-containing polymers. Acid catalysts, such as stannous chloride, can be used advantageously to initiate self-crosslinking and crosslinking between the aldehyde-modified polyesters of this invention and a hydroxyl-containing material.

The modified polyester resins of this invention are suitable for crosslinking with water-soluble crosslinking resins, such as the phenoplasts and the aminoplasts. As is known in the art, these include phenol-formaldehyde resins, urea-formaldehyde resins, melamine-formaldehyde resins, and the like. Melamine-formaldehyde resins are particularly preferred as crosslinking resins for the modified polyester resins of this invention.

In application, an aqueous coating composition comprising polyester of this invention in amounts ranging from 1–99 parts by weight and a suitable crosslinking resin in amounts ranging from 99–1 parts by weight, said parts by weight totaling 100, can be spread in film form on a suitable substrate and cured. Curing can be conveniently effected by heating at temperatures of from 215° to 375° F., usually 225° to 300° F. More rapid curing can be achieved at higher temperatures, e.g., 425° F. The cured films obtained from these aqueous coating compositions are characterized by excellent adhesion to the substrate, excellent flexibility, toughness, and solvent- and water-resistance. These novel compositions can be modified physically and/or chemically by the addition of agents such as pigments, extenders, plasticizers, ultraviolet light stabilizers, solvents, coloring agents, release agents, and lubricants.

The present invention is further illustrated by the following specific examples, which include the preferred embodiment. Unless otherwise indicated, all parts and percentages are by weight.

EXAMPLES 1–3

These examples illustrate the preparation of water dispersible polyesters modified with phenyl stearic acid.

EXAMPLE 1

A reaction mix comprising 14.2 parts of Carbowax 1540 (polyoxyethylene glycol, number average molecular weight about 1500), 12.1 parts diethylene glycol, 17.5 parts trimethylol ethane, 17.3 parts of isophthalic acid, and 9.9 parts of adipic acid were reacted at a temperature of 320° to 420° F. to an acid number 42 with the evolution of 73 ml. of water. Phenyl stearic acid (29.0 parts) was then poured in and the reaction was continued at 380° to 410° F. to an acid number of 33. The resin was mixed with triethyl amine to neutralize the residual acidity and cut with water to a non-volatile content of 67%. The system was cloudy when warm but cleared upon cooling. Analysis of the product gave a non-volatile content of 66.5%, pH of 8.8, and viscosity of 1800 cps. (4/100).

EXAMPLE 2

A reaction mix comprising 14.4 parts of Carbowax 1540, 29.1 parts of phenyl stearic acid, 17.8 parts of trimethylolethane, and 12.3 parts of diethylene glycol was reacted at 400° to 450° F. to an acid number of 10. 26.4 parts of adipic acid were then added and the reaction was continued at 350° to 400° F. to an acid number of 25–30. The system was then neutralized with aqueous ammonia and cut with water to 60% non-volatile. Analysis of the product gave a non-volatile content of 66.0, pH of 8.0, and viscosity of 4300 cps. (4/100).

EXAMPLE 3

A reaction mix comprising 14.4 parts of Carbowax 1540, 12.3 parts of diethylene glycol, 17.8 parts of trimethylol ethane, 26.4 parts of adipic acid, and 28.1 parts of phenyl stearic acid was reacted at a temperature from 260° to 400° F. to an acid number of 25.6 with the evolution of 89 ml. of water. The product was neutralized with triethylamine to 90% of the theoretical remaining carboxyl content and cut with water to 66% non-volatile. A 20% modification with butyl Cellosolve of the dispersed material gave a clear product down to about 10% non-volatile. The analysis of the dispersed material gave a non-volatile content of 65.5%, pH of 9.0, and viscosity of 1220 cps. (4/100).

EXAMPLE 4

This example illustrates the preparation of a cross-linking composition comprising the modified polyester of this invention and an aminoplast.

The polyester resin composition prepared in Example 1 was combined with a 70% non-volatile aqueous solution of RI–2027 (a water-soluble melamine-formaldehyde condensate) to give a weight ratio of polyester to melamine-formaldehyde of about 4:1. A clear 3 mil film was cast on a glass plate and allowed to dry at room temperature. The film was then baked at 250° F. for 30 minutes. The cured film had good hardness, flexibility, adhesion, and water- and solvent-resistance.

EXAMPLE 5

This example illustrates the preparation of a water-dispersible polyester modified with a hydroxy phenyl stearic acid.

22.3 parts of Carbowax 1540, 12.3 parts of diethylene glycol, 11.1 parts of trimethylolethane, and 30.6 parts of p-hydroxy phenyl stearic acid were reacted at 400–460° F. to an acid value of 5. The reaction was allowed to cool to 380° F. 21.7 parts of isophthalic acid was added, the temperature was raised slowly to 410°, and the water was collected. The mixture was reacted to an acid value of 25–30 and then stopped. The system was neutralized with ammonia and cut with water to 60% non-volatiles. Final analysis gave a non-volatile content of 59.6, pH of 8.4, and viscosity of 3700 cps. (4/100).

EXAMPLE 6

This example illustrates the condensation of an aldehyde with a hydroxy phenyl stearic acid modified poly- 97 parts of the product of Example 5 (.47 hydroxyl equivalent) was reacted with 3 parts of paraformaldehyde (.75 equivalent) by heating to 240° F. for 6 hours after which the mixture had a zero free-formaldehyde content. Analysis gave a non-volatile content of 33%, pH of 8.0, and viscosity of 2700 cps. (4/100).

EXAMPLE 7

This example illustrates the crosslinking of hydroxy compounds and the formaldehyde condensates of hydroxy phenyl stearic acid modified polyesters.

A condensate of formaldehyde and hydroxy phenyl stearic acid modified polyester was mixed in equal proportions with each of the following hydroxy-containing materials:

(A) Carbowax 1540 (polyoxyethylene glycol);
(B) Aroset 4110 (a water-dispersible acrylic copolymer containing free hydroxyl groups); and
(C) RI–2027 (a water soluble melamine-formaldehyde condensate).

Films made with each of the above blends and catalyzed with stannous chloride were baked at 300° F. for 15 minutes. The films exhibited excellent flexibility and showed evidence of crosslinking by their excellent water-resistance.

Although the present invention has been described in considerable detail with respect to preferred embodiments thereof, it is to be understood that many variations and modifications may be made within the scope of the invention as described above and as defined in the appended claims.

What is claimed is:

1. In a water-dispersible polyester resin having an acid number of 15 to 30 comprising the condensation product of at least one polycarboxylic acid and at least one polyol, the improvement comprising including in said polyester 10 to 25% by weight of co-reacted residues of a mono-aryl substituted fatty acid wherein said fatty acid is a monocarboxylic acid having 8 to 24 carbon atoms in the alkyl chain and said aryl substituent is phenyl, naphthyl, substituted phenyl or substituted naphthyl, in which said substituent is alkyl having 1 to 8 carbon atoms, or hydroxyl.

2. The modified polyester resin of claim 1 wherein said mono-aryl substituted fatty acid contains 16 to 22 carbon atoms in the alkyl chain.

3. The modified polyester resin of claim 1 wherein said mono-aryl substituted fatty acid contains phenyl as the aryl substituent.

4. The modified polyester resin of claim 1 wherein said mono-aryl substituted fatty acid contains hydroxy phenyl as the aryl substituent.

5. The modified polyester resin of claim 1 wherein said mono-aryl substituted fatty acid is selected from the isomers of phenyl stearic acid.

6. The modified polyester resin of claim 1 having an acid number in the range of 25 to 30.

7. The polyester resin of claim 1 comprising the condensation product of:
    (a) an isomer of phenyl stearic acid;
    (b) acid selected from the group consisting of iso-phthalic, o-phthalic, and terephthalic acids or anhydrides, and mixtures thereof;
    (c) non-oxidizing, saturated aliphatic dicarboxylic acid containing 4 to 18 carbon atoms;
    (d) a polyalkylene glycol selected from the group consisting of polyethylene glycols and polypropylene glycols having a molecular weight between 600 and 6,000; and
    (e) at least one saturated polyhydric alcohol containing from 2 to 16 carbon atoms and at least two hydroxy groups;
a total of 0.95 to 1.8 moles of polyol being present per mole of dicarboxylic acid.

8. In the process for the preparation of water-dispersible polyester resins involving the heating of a reaction mixture comprising at least one polyhydric alcohol and at least one polycarboxylic acid, the improvement comprising the step of including in said reaction mixture 10 to 25% by weight of a mono-aryl substituted fatty acid wherein said fatty acid is a monocarboxylic acid having 8 to 24 carbon atoms in the alkyl chain and said aryl substituent is phenyl, naphthyl, substituted phenyl or substituted naphthyl, in which said substituent is alkyl having 1 to 8 carbon atoms, or hydroxyl, and conducting the reaction until an acid number of 15 to 30 is achieved.

9. The process of claim 8 wherein said mono-aryl substituted fatty acid contains 16 to 22 carbon atoms in the alkyl chain.

10. The process of claim 8 wherein said mono-aryl substituted fatty acid contains phenyl as the aryl substituent.

11. The process of claim 8 wherein said mono-aryl substituted fatty acid contains hydroxy phenyl as the aryl substituent.

12. The process of claim 8 wherein said mono-aryl substituted fatty acid is selected from the isomers of phenyl stearic acid.

13. The process of claim 8 wherein said polyester resin has an acid number in the range of 25 to 30.

14. The process of claim 8 wherein said polyester comprises the condensation product of:
    (a) an isomer of phenyl stearic acid;
    (b) acid selected from the group consisting of isophthalic, o-phthalic, and terephthalic acids, or anhydrides, and mixtures thereof;
    (c) non-oxidizing, saturated aliphatic dicarboxylic acid containing 4 to 18 carbon atoms;
    (d) a polyalkylene glycol selected from the group consisting of polyethylene glycols and polypropylene glycols having a molecular weight between 600 and 6,000; and
    (e) at least one saturated polyhydric alcohol containing from 2 to 16 carbon atoms and at least two hydroxy groups;
a total of 0.95 to 1.8 moles of polyol being present per mole of dicarboxylic acid.

15. An aqueous dispersion of the neutralized polyester of claim 1.

16. An aqueous dispersion of the neutralized polyester of claim 4.

17. A composition of matter comprising the 1–99 parts by weight polyester of claim 1 and 99–1 parts by weight of a cross-linking resin selected from the group consisting of aminoplasts and phenoplast resins, said parts by weight totalling 100.

18. A composition of matter comprising the condensation product of (1) an aldehyde and (2) the modified polyester of claim 4.

19. A composition of matter comprising (1) the product of claim 18 and (2) an organic hydroxy compound.

References Cited

UNITED STATES PATENTS

| | | | |
|---|---|---|---|
| 1,972,568 | 9/1934 | McKee et al. | 260—413 |
| 2,380,305 | 7/1945 | Gleason | 252—57 |
| 2,961,428 | 11/1960 | Muller et al. | 260—52 |
| 2,973,331 | 2/1961 | Kraft | 260—22 |
| 3,223,659 | 12/1965 | Curtice et al. | 260—22 |
| 3,265,666 | 8/1966 | Brown et al. | 260—77.5 |
| 3,310,512 | 3/1967 | Curtice | 260—29.2 |
| 3,392,129 | 7/1968 | Hoy et al. | 260—22 |

DONALD E. CZAJA, Primary Examiner

R. W. GRIFFIN, Assistant Examiner

U.S. Cl. X.R.

117—124, 161; 260—16, 21, 22, 23, 29.3, 29.4, 32.4, 32.6, 33.2